US009016222B2

(12) United States Patent
Kim et al.

(10) Patent No.: US 9,016,222 B2
(45) Date of Patent: Apr. 28, 2015

(54) CARGO HOLD OF A VESSEL FOR TRANSPORTING LIQUEFIED GAS

(71) Applicants: Ji Han Kim, Geoje-si (KR); Sang Eon Chun, Geoje-si (KR); Jeong Oh Hwang, Gimhae-si (KR)

(72) Inventors: Ji Han Kim, Geoje-si (KR); Sang Eon Chun, Geoje-si (KR); Jeong Oh Hwang, Gimhae-si (KR)

(73) Assignee: Samsung Heavy Industries Co., Ltd. (KR)

( * ) Notice: Subject to any disclaimer, the term of this patent is extended or adjusted under 35 U.S.C. 154(b) by 195 days.

(21) Appl. No.: 13/754,280

(22) Filed: Jan. 30, 2013

(65) Prior Publication Data

US 2013/0206053 A1 Aug. 15, 2013

Related U.S. Application Data

(63) Continuation of application No. PCT/KR2011/003674, filed on May 19, 2011.

(30) Foreign Application Priority Data

Jul. 30, 2010 (KR) ........................ 10-2010-0074389

(51) Int. Cl.
*B63B 25/16* (2006.01)
*B63B 3/68* (2006.01)
(Continued)

(52) U.S. Cl.
CPC . *B63B 25/16* (2013.01); *B63B 3/68* (2013.01); *F17C 3/04* (2013.01)

(58) Field of Classification Search
CPC ...................... B63B 3/68; B63B 25/08; B63B 25/12–25/16; B63B 2701/22; F17C 1/12; F17C 3/04; F17C 13/08; B65D 90/06
USPC ........ 114/74 R, 74 T, 74 A; 220/560, 560.07, 220/560.11, 560.12, 560.15, 901
See application file for complete search history.

(56) References Cited

U.S. PATENT DOCUMENTS 3,929,247 A * 12/1975 Borup ...................... 220/560.15
5,501,359 A * 3/1996 Chauvin et al. .......... 220/592.26
(Continued)

FOREIGN PATENT DOCUMENTS

CN 101688640 A 3/2010
DE 102007056635 A1 6/2008
(Continued)

OTHER PUBLICATIONS

European Search Report Application No. EP 11 17 5494 Completed: Nov. 10, 2011; Mailing Date: Nov. 21, 2011 5 pages.
(Continued)

*Primary Examiner* — Ajay Vasudeva
(74) *Attorney, Agent, or Firm* — St. Onge Steward Johnston & Reens LLC

(57) ABSTRACT

A cargo tank for a liquefied gas carrier ship includes: a main wall surrounding a receiving space in which the liquefied gas is received; a panel assembly surrounding the main wall; and an outer wall surrounding the panel assembly. The panel assembly includes: a plurality of first thermal insulating panels; a plurality of first auxiliary walls; a plurality of second thermal insulating panels fixed on second surfaces of the first auxiliary walls; a bridge pad disposed between the second thermal insulating panels; and a second auxiliary wall located between the bridge pad and the first auxiliary walls. The first thermal insulating panel and the first auxiliary wall are adhered to each other, and a first stress dispersion region prevents the first auxiliary wall or the second auxiliary wall from being damaged due to thermal expansions or contractions of the first thermal insulating panels and the bridge pad.

4 Claims, 4 Drawing Sheets

(51) Int. Cl.

| | |
|---|---|
| ***F16C 1/12*** | (2006.01) |
| ***F16C 3/04*** | (2006.01) |
| ***B65D 90/06*** | (2006.01) |
| ***F17C 3/04*** | (2006.01) |

(56) References Cited

U.S. PATENT DOCUMENTS

| | | | | |
|---|---|---|---|---|
| 5,586,513 | A * | 12/1996 | Jean et al. | 114/74 A |
| 7,325,288 | B2 * | 2/2008 | Yang et al. | 29/455.1 |
| 7,819,273 | B2 * | 10/2010 | Yang et al. | 220/592.26 |
| 8,317,056 | B2 * | 11/2012 | Lee et al. | 220/560.12 |
| 8,444,803 | B2 * | 5/2013 | Gomart | 156/295 |

FOREIGN PATENT DOCUMENTS

| | | | |
|---|---|---|---|
| FR | 2781556 | A1 | 1/2000 |
| JP | 2010048027 | A | 3/2010 |
| KR | 100853178 | B1 | 8/2008 |
| KR | 20090124466 | A | 12/2009 |
| KR | 20090132514 | A | 12/2009 |
| KR | 20090132534 | A | 12/2009 |
| WO | 2008147003 | A1 | 12/2008 |
| WO | 2009154427 | A2 | 12/2009 |

OTHER PUBLICATIONS

International Preliminary Report on Patentability Application No. PCT/KR2011/003674 Completed: Nov. 15, 2012 5 pages.

International Search Report and Written Opinion of the International Searching Authority Application No. PCT/KR2011/003674 Completed: Jan. 20, 2012; Mailing Date: Feb. 6, 2012 6 pages.

Office Action from State Intellectual Property Office of the People's Republic of China Application No. 201180037391.9 Issued: Jan. 6, 2015 13 pages.

* cited by examiner

CARGO HOLD OF A VESSEL FOR TRANSPORTING LIQUEFIED GAS

FIELD OF THE INVENTION

The present invention relates to a cargo tank for liquefied gas carrier ship, and more particularly, to a cargo tank for liquefied gas carrier ship which includes a plurality of thermal insulating panels.

BACKGROUND OF THE INVENTION

Liquefied gas such as liquefied natural gas (LNG) is obtained by liquefying a gas that is in a vapor state at a room temperature at an extremely low temperature that is lower than a saturation temperature, and is carried by a conveying unit such as ship.

In addition, a cargo tank for receiving the liquefied gas is provided in the ship.

The cargo tank has various types of thermal insulating structures in order to maintain the liquefied state of the liquefied gas at the extremely low temperature, for example, −163° C. or less, from departure place where the liquefied gas is injected into the cargo tank to destination where the liquefied gas is unloaded from the cargo tank. In addition, the cargo tank includes a liquefied gas leakage prevention structure for preventing the liquefied gas from leaking out of the cargo tank.

The cargo tank may be manufactured in various types, for example, a MOSS type of independence tank that is formed as a spherical metal structure or a membrane tank type formed to have a plurality of cell structures, according a shape and a structure of the cargo tank.

In particular, the cargo tank manufactured as the membrane tank type includes a main wall formed of stainless steel for surrounding a receiving space that is formed in the cargo tank to receive the liquefied gas, a thermal insulating panel assembly surrounding the main wall, and an outer wall surrounding the thermal insulating panel assembly.

In addition, the thermal insulating panel assembly is formed of a thermal insulating material such as polyurethane foams, and includes a plurality of first thermal insulating panels and a plurality of second thermal panels respectively disposed in two-layered structures, and auxiliary walls disposed between the first thermal insulating panels and the second thermal insulating panels and formed of a triplex material having a plurality of layers formed of, for example, aluminum and fiber glass.

Here, the plurality of first thermal insulating panels and the plurality of second thermal insulating panels are disposed alternately with each other. In addition, bridge pad is disposed between the plurality of second thermal insulating panels for filling separate spaces between the second thermal insulating panels.

In addition, the auxiliary walls disposed between the plurality of first thermal insulating panels, the plurality of second thermal insulating panels, and the plurality of bridge pad are fixed on the panels or the pads via an attachment method.

Here, the plurality of first thermal insulating panels disposed in a first layer of the thermal panel assembly and the plurality of second thermal insulating panels and the bridge pad disposed in a second layer of the thermal panel assembly overlap each other to certain regions.

On the other hand, the main wall and the thermal insulating panel assembly that are adjacent to the receiving space are exposed to the extremely low temperature, in a state where the liquefied gas is received in the receiving space of the cargo tank.

Therefore, the plurality of panels and the plurality of bridge pad forming the thermal insulating panel assembly are thermally contracted. Here, when the plurality of panels and the plurality of bridge pad are contracted in a state of overlapping each other to a predetermined degree, stress caused by the thermal contraction of the panels and the bridge pad is applied on the auxiliary walls fixed between the plurality of panels and the plurality of bridge pad.

In addition, since the stress is concentrated on boundaries of the panels and the bridge pad, the auxiliary walls may be broken by the concentrated stress, and thus, a sealing state of the liquefied gas may be damaged.

SUMMARY OF THE INVENTION

The present invention provides a cargo tank for liquefied gas carrier ship which prevents auxiliary walls from being damaged due to stress caused by thermal contraction of a plurality of panels and a bridge pad included in a thermal insulating panel assembly.

According to an aspect of the present invention, a stress dispersion region is formed in a panel assembly of a cargo tank for liquefied gas carrier ship so that a stress generating between panels and pads of the panel assembly may be dispersed.

According to the embodiments of the present invention, the stress caused by the contractions of the first thermal insulating panel and the bridge pad and applied between the first and second auxiliary walls is dispersed by the stress dispersion region, and thus, the damages of the auxiliary walls due to the excessive concentration of the stress may be prevented.

DETAILED DESCRIPTION OF THE INVENTION

According to an aspect of the present invention, there is provided a cargo tank for a liquefied gas carrier ship, the cargo tank including: a main wall surrounding a receiving space in which the liquefied gas is received; a panel assembly surrounding the main wall; and an outer wall surrounding the panel assembly, wherein the panel assembly includes: a plurality of first thermal insulating panels arranged to be separate first distances from each other; a plurality of first auxiliary walls, first surfaces of which are fixed on the first thermal insulating panels, separate from each other; a plurality of second thermal insulating panels fixed on second surfaces of the first auxiliary walls and arranged with second distances, which are greater than the first distances; a bridge pad disposed between the second thermal insulating panels and separate from the second thermal insulating panels; and a second auxiliary wall located between the bridge pad and the first auxiliary walls, having first surfaces fixed on the bridge pad, and second surfaces, a part of which are fixed on the first auxiliary walls, wherein between each of the first thermal insulating panel and each of the first auxiliary walls fixed on the first thermal insulating panel, a first fixing region on which an adhesive is applied to fix the first thermal insulating panel and the first auxiliary wall to each other, and a first stress dispersion region on which the adhesive is not applied for preventing the first auxiliary wall or the second auxiliary wall from being damaged due to thermal expansions or contractions of the first thermal insulating panels and the bridge pad.

The first stress dispersion region may be located on a circumferential portion of the first surface in the first auxiliary wall.

A second fixing region may be disposed between each of the first auxiliary walls and second auxiliary wall, and some parts of the first and second fixing regions may overlap each other.

A second stress dispersion region which does not overlap the first stress dispersion region may be formed between each of the first auxiliary walls and each of the bridge pad, for preventing the first auxiliary wall or the second auxiliary wall from being damaged due to thermal expansions or contractions of the first thermal insulating panels and the bridge pad.

Hereinafter, embodiments of the present invention will be described in detail with reference to accompanying drawings.

Figure 1:
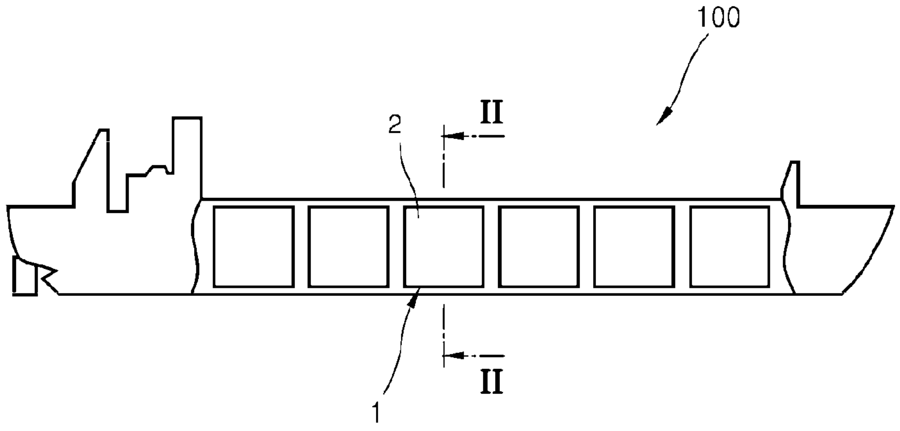
FIG. 1 is a (cross-sectional view) of a liquefied gas carrier ship according to an embodiment of the present invention.
Figure 2:
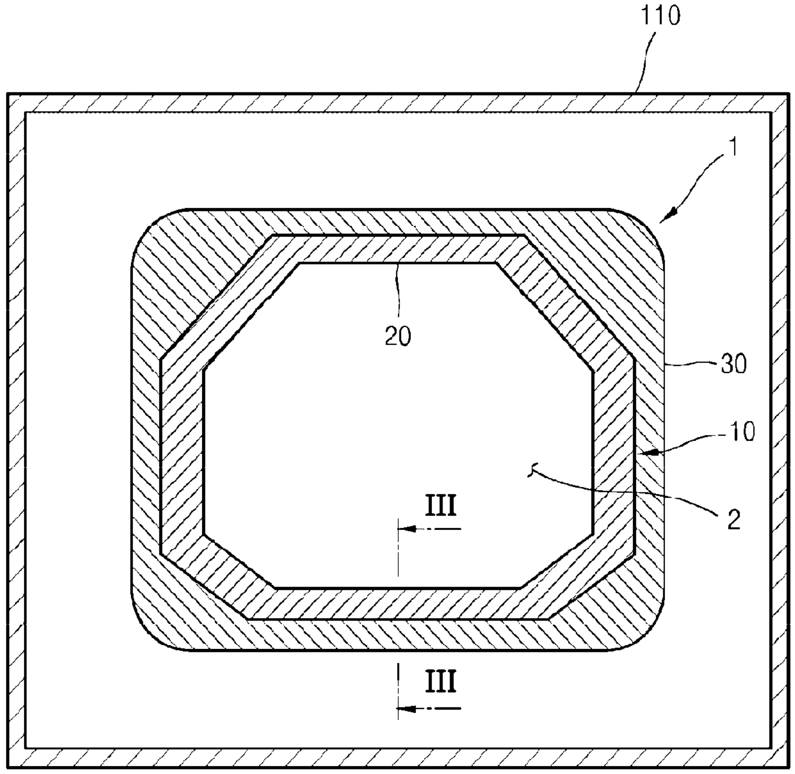
FIG. 2 is a cross-sectional view of a cargo tank taken along a line II-II of FIG. 1.

FIG. 1 is a cross-sectional view of a liquefied gas carrier ship 100 according to an embodiment of the present invention, and FIG. 2 is a cross-sectional view of a cargo tank 1 taken along a line II-II of FIG. 1.

Referring to FIGS. 1 and 2, the liquefied gas carrier ship 100 according to the present embodiment is a ship for carrying liquefied gas that is liquefied at an extremely low temperature, for example, liquefied natural gas (LNG), and includes a cargo tank 1 for receiving the liquefied gas.

The cargo tank 1 may be manufactured in various types, for example, a MOSS type of independent tank, in which a part of the cargo tank that is formed as a spherical metal structure protrudes out of the ship, and a membrane tank type formed to have a membrane type cargo tank.

The cargo tank 1 of the present embodiment is formed as the membrane tank type.

The cargo tank 1 is disposed on the liquefied gas carrier ship 100 in a state of being surrounded by an outer wall 110 of the ship 100. In addition, a ballast tank may be disposed between the cargo tank 1 and the outer wall 110 of the ship for adjusting buoyancy of the ship 100.

The cargo tank 1 includes a receiving space 2 formed in the cargo tank 1 for receiving the liquefied gas, a main wall 20 surrounding the receiving space 2, a panel assembly 10 surrounding the main wall 20, and an outer wall 30 surrounding the panel assembly 10.

The receiving space 2 is sealed by the main wall 20 so as to prevent the liquefied gas received in the receiving space 2 from leaking out of the receiving space 2. In addition, the receiving space 2 is partitioned into a plurality of spaces in the liquefied gas carrier ship 100. Therefore, even if one of the partitions of the receiving space 2 is damaged, sealing states of the other partitions of the receiving space 2 may be maintained.

The main wall 20 surrounds the receiving space 2 and may be formed of, for example, a stainless steel material having a high rigidity. In addition, the main wall 20 performs a primary blocking for preventing the liquefied gas from leaking out of the receiving space 2.

The panel assembly 10 thermally insulates the receiving space 2 from an outer portion of the cargo tank 1 such that a temperature of the liquefied gas received in the receiving space 2 may be maintained at the extremely low temperature. In addition, auxiliary walls 14 and 15 (shown in FIG. 3) that are continuously succeeded are disposed in the panel assembly 10, and the auxiliary walls 14 and 15 perform a secondary blocking for preventing the liquefied gas from leaking out of the receiving space 2.

The outer wall 30 forms an outer appearance of the cargo tank 1, and surrounds the panel assembly 10. In addition, the outer wall 30 is formed of a metal material of high rigidity to prevent the main wall 20 and the panel assembly 10 from being damaged and the shape of the cargo tank 1 from deforming due to external shocks.

On the other hand, the panel assembly 10 of the present embodiment includes a plurality of panels, a plurality of pads, and a plurality of walls for thermally insulating the receiving space 2 and for preventing the liquefied gas received in the receiving space 2 from leaking out of the receiving space 2.

Hereinafter, structures of the panel assembly 10 according to the present embodiment will be described in more detail.

Figure 3:
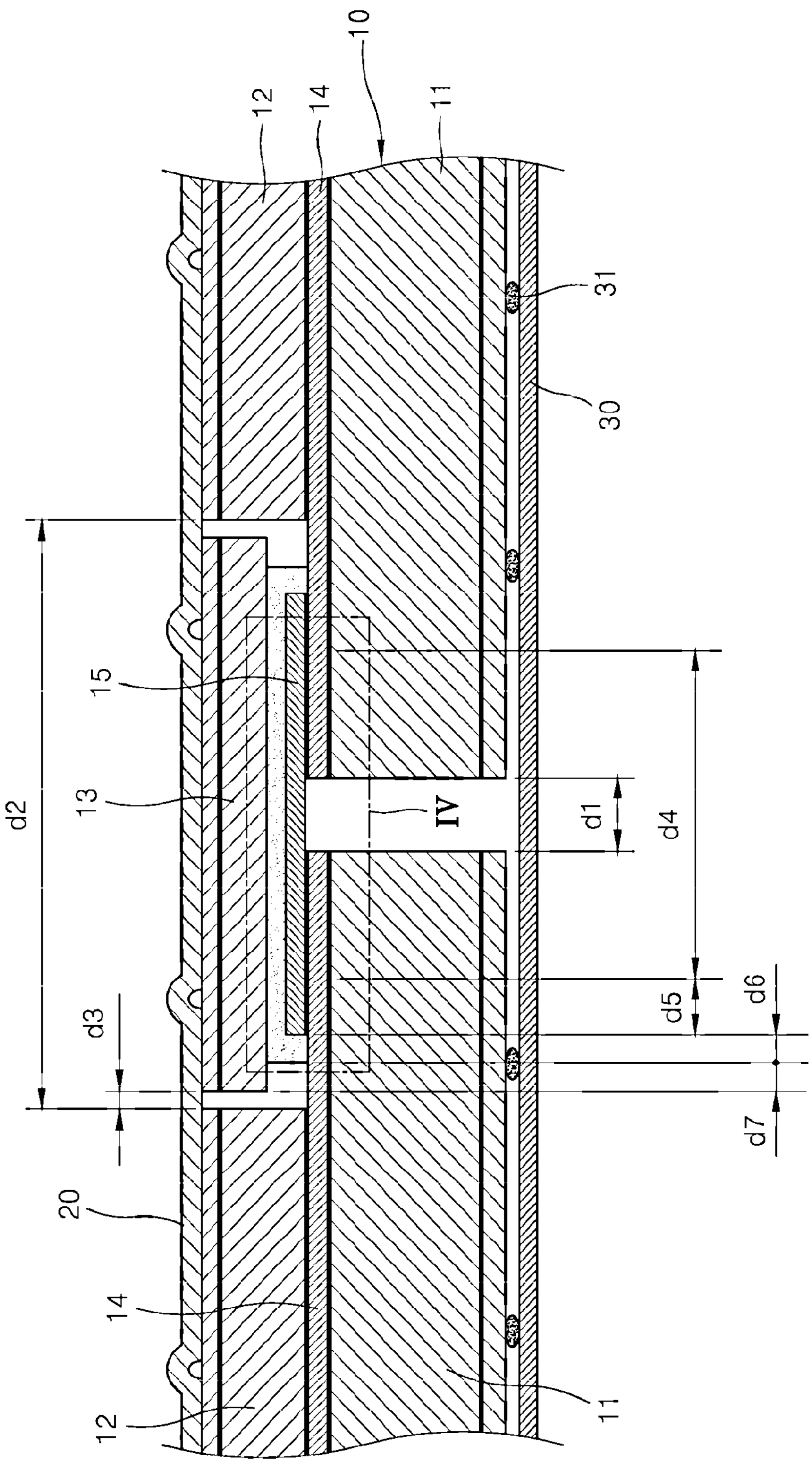
FIG. 3 is a cross-sectional view of the cargo tank taken along a line III-III of FIG. 2.
Figure 4:
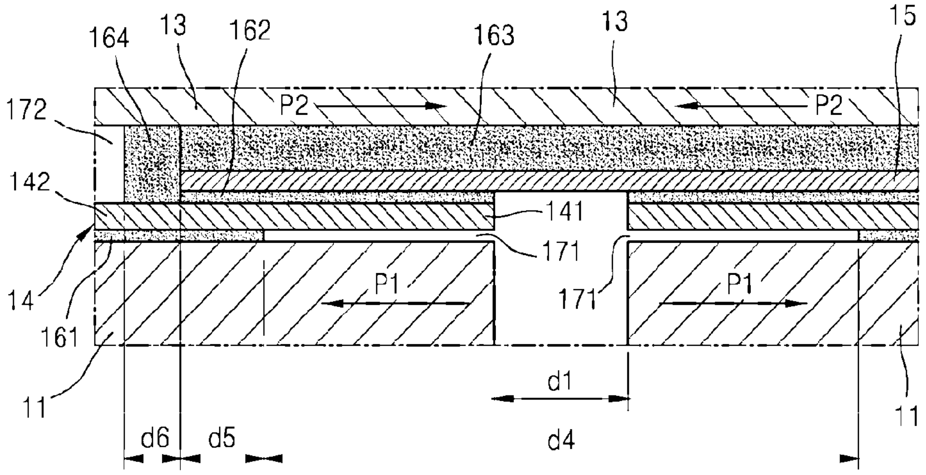
FIG. 4 is an expanded view of part IV shown in FIG. 3.

FIG. 3 is a cross-sectional view of the panel assembly 10 taken along a line III-III of FIG. 2, and FIG. 4 is an expanded view of part IV shown in FIG. 3.

Referring to FIGS. 3 and 4, the panel assembly 10 of the present embodiment is located between the main wall 20 surrounding the receiving space 2 and the outer wall 30 forming the outer appearance of the cargo tank 1.

Here, an attaching member 31 is disposed on a side of the panel assembly 10, which is adjacent to the outer wall 30, so that the panel assembly 10 may be fixed on the outer wall 30 in a state of being separated a predetermined gap from the outer wall 30.

In more detail, in a state where a side of a coupling member such as a stud bolt (not shown) is fixed on the outer wall 30, the other side of the coupling member is inserted into a hole (not shown) formed in a first thermal insulating panel 11 of the panel assembly 10 so that the outer wall 30 and the panel assembly 10 may be fixed to each other in a state of being separated from each other. Here, the attaching member 31 such as Mastic is disposed in the space between the outer wall 30 and the panel assembly 10, and the attaching member 31 is hardened so as to firmly fix the outer wall 30 and the panel assembly 10 to each other.

In addition, the main wall 20 may include a plurality of metal plates, and the plurality of metal plates are fixed to each other by welding.

On the other hand, the panel assembly 10 includes a plurality of first thermal insulating panels 11, a plurality of second thermal insulating panels 12, a plurality of bridge pad 13, a plurality of first auxiliary walls 14, and a second auxiliary wall 15. In addition, the components in the panel assembly 10 are fixed to each other by a plurality of fixing regions 161, 162, 163, and 164 on which an adhesive is applied.

The first thermal insulating panels 11, the second thermal insulating panels 12, and the bridge pad 13 are arranged in a plurality of layered structures in the panel assembly, and may be formed of a thermal insulating member such as rigid polyurethane foam (RPUF).

The first thermal insulating panels 11 are arranged in a first layer that is adjacent to the outer wall 30 to be separate a first distance d1 from each other. Here, a filling material such as glass wool may be filled in the first distance d1.

The second thermal insulating panels 12 are arranged in a second layer that is adjacent to the main wall 20 to be separate a second distance d2 that is greater than the first distance d1 from each other.

In addition, the bridge pad 13 is arranged in the second layer, like the second thermal insulating panels 12, between the second thermal insulating panels 12 that are separate from each other. Here, the bridge pad 13 is arranged to be separate a third distance d3 from the adjacent second thermal insulating panels 12.

Some parts of the first thermal insulating panels 11 disposed in the first layer and some parts of the bridge pad 13 disposed in the second layer may overlap each other.

On the other hand, the auxiliary walls 14 and 15 are disposed between the first layer, in which the first thermal insulating panels 11 are arranged, and the second layer, in which the second thermal insulating panels 12 and the bridge pad 13 are arranged, for additionally maintaining the sealing state of the receiving space 2.

The auxiliary walls 14 and 15 may be formed of a triplex material which is fabricated by adhering fiber glasses on both surfaces of an aluminum thin plate.

The auxiliary walls 14 and 15 include a plurality of first auxiliary walls 14 and a plurality of second auxiliary walls 15.

The first thermal insulating panel 11 is fixed on a surface (first surface) in each of the first auxiliary walls 14, and the second thermal insulating panel 12 is fixed on the other surface(second surface) in each of the first auxiliary walls 14.

In addition, each of the second thermal insulating walls 15 is disposed between the bridge pad 13 and the first thermal insulating panels 11 overlapping the bridge pad 13. The bridge pad 13 is fixed on a surface of the second auxiliary wall 15, and a part of the other surface in the second auxiliary wall 15 is fixed on a part of the surface of the first auxiliary wall 14.

That is, the first auxiliary walls 14 and the second auxiliary walls 15 are arranged successively and fixed to each other so as to perform the secondary blocking of the receiving space 2.

The fixing regions 161, 162, 163, and 164 for fixing the panels, the bridge pad, and the auxiliary walls to each other include first fixing regions 161, second fixing regions 162, third fixing regions 163, and fourth fixing regions 164.

Each of the first fixing regions 161 is disposed between each of the first thermal insulating panels 11 and each of the first auxiliary walls 14, and the adhesive is applied onto the first fixing region 161 to fix the first thermal insulating panel 11 and the first auxiliary wall 14 to each other.

In addition, each of the second fixing regions 162 is disposed between each of the first auxiliary walls 14 and the second auxiliary wall 15, and the adhesive is applied onto the second fixing region 162 to fix the first and second auxiliary walls 14 and 15 to each other.

Likewise, each of the third fixing regions 163 is disposed between the second auxiliary wall 15 and the bridge pad 13, and the adhesive is applied onto the third fixing region 163 to fix the second auxiliary wall 15 and the bridge pad 13 to each other.

As an example, the adhesive is applied to the third fixing region 163 to a thickness that is greater than thicknesses of the first auxiliary wall 14 and the second auxiliary wall 15.

Therefore, during installing the panel assembly 10 of the present embodiment in the cargo tank 1, when an installation height of the bridge pad 13 is higher than that of the second auxiliary wall 15, the bridge pad 13 are pushed toward the first auxiliary walls 14 and the adhesive disposed on the third fixing regions 163 is compressed so that the installation height of the bridge pad 13 may be adjusted to the level of the second auxiliary wall 15.

On the other hand, the fourth fixing region 164 is succeeded to the third fixing region 163, and the first auxiliary wall 14 is located at a side of the fourth fixing region 164 and the bridge pad 13 is disposed at the other side of the fourth fixing region 164. That is, the fourth fixing region 164 is disposed along with boundaries of the second fixing region 162, the third fixing region 163, and the second auxiliary wall 15.

Therefore, the second auxiliary wall 15 is surrounded by the adhesive applied on the second, third, and fourth fixing regions 162, 163, and 164.

In addition, some of the adhesive applied on the third fixing region 163 may be injected into the fourth fixing region 164 by the force applied from the bridge pad 13 toward the first thermal insulating panel 11.

On the other hand, in a state where the thermal insulating panels or the bridge pad and the auxiliary walls are fixedly adhered to each other, when the liquefied gas at the extremely low temperature is received in the receiving space 2, the thermal insulating panels and the bridge pad are thermally contracted due to the extremely low temperature.

Here, contraction forces are applied to the first thermal insulating panels 11 arranged in the first layer and the bridge pad 13 arranged in the second layer and overlapping the first thermal insulating panels 11 in opposite directions, that is, in a direction P1 and a direction P2. Therefore, stress is generated on the first auxiliary walls 14 and the second auxiliary wall 15 disposed between the first thermal insulating panels 11 and the bridge pad 13 due to the contraction forces applied in the opposite directions.

On the other hand, when the stress is applied to the first and second auxiliary walls 14 and 15 in a state where the first and second auxiliary walls 14 and 15 are fixed to each other by the second fixing region 162 and entire portion of the surface of the first auxiliary wall 14 is completely fixed on the first thermal insulating panel 11, the concentration of stress is maximized on a portion where a pair of first and second auxiliary walls 14 and 15 that are adjacent to each other, that is, the first distance d1.

If the concentration of the stress is maximized and the stress exceeds a threshold stress of one of the first and second auxiliary walls 14 and 15, the first or second auxiliary wall 14 or 15 is damaged and the sealing state of the receiving space 2 is damaged.

Therefore, in the panel assembly 10 of the cargo tank 1 according to the present embodiment, first stress dispersion regions 171 on which the adhesive is not applied are formed between the first thermal insulating panels 11 and the first auxiliary walls 14 fixed on the first thermal insulating walls 11.

The adhesive is not applied on the first stress dispersion region 171, and the first thermal insulating panel 11 and the first auxiliary wall 14 are not fixed to each other on the portion where the first stress dispersion region 171 is formed.

Here, the first stress dispersion region 171 is located on a circumferential portion 141 on a surface of the first auxiliary wall 14, and the first fixing region 161 for fixing the first thermal insulating panel 11 and the first auxiliary wall 14 to each other is located on an inner portion 142 of the first auxiliary wall 14, which is classified based on the first stress dispersion region 171

In addition, a first stress dispersion distance d4 that is greater than the first distance d1 is formed by one pair of first stress dispersion regions 171 formed between one pair of first thermal insulating panels 11 and the first auxiliary walls 14 that are separate the first distance d1 from each other.

That is, when the first stress dispersion region 171 is not formed, the stress is concentrated on the distance between the circumferences of a pair of first auxiliary walls 14, that is, the first distance d1.

However, as in the present embodiment, when the first stress dispersion region 171 is formed, the stress is dispersed to the distance between a pair of first fixing regions 161, that is, the first stress dispersion distance d4, and thereby preventing the stress that is generated due to the thermal contraction of the first thermal insulating panel 11 and the bridge pad 13 from excessively concentrating on a certain region.

In addition, a first fixing distance d5 and a second fixing distance d6 are formed adjacent to the first stress dispersion distance d4 in a direction apart from the first stress dispersion distance d4. Here, the first fixing distance d5 means a portion where the first thermal insulating panel 11, the first fixing region 161, the first auxiliary wall 14, the second fixing region 162, the second auxiliary wall 15, the third fixing region 163, and the bridge pad 13 overlap each other. In addition, the second fixing distance d6 means a portion where the first thermal insulating panel 11, the first fixing region 161, the first auxiliary wall 14, the fourth fixing region 164, and the bridge pad 13 overlap each other.

On the other hand, a part of the first fixing region 161 that is disposed between each of the first thermal insulating panels 11 and the first auxiliary wall 14 fixed on the first thermal insulating panel 11 may overlap a part of the second fixing region 162 that is disposed between each of the first auxiliary walls 14 and the second auxiliary wall 15 fixed on the first auxiliary wall 14.

Therefore, the stress applied between the first and second auxiliary walls 14 and 15 may be dispersed to the portion where the first and second fixing regions 161 and 162 overlap each other. In addition, some parts of the first fixing region 161 and the second fixing region 162 overlap each other, and thus, the fixed adhesion between the first thermal insulating panel 11, the first auxiliary wall 14, and the second auxiliary wall 15 performed by the first and second fixing regions 161 and 162 may be firmly performed, and strength may be increased.

On the other hand, the first auxiliary wall 14 has an area corresponding to that of the first thermal insulating panel 11, and the second auxiliary wall 15 has an area that is smaller than that of the bridge pad 13.

Therefore, a part of the surface of the bridge pad 13, on which a surface of the second auxiliary wall 15 is fixed, corresponds to the second auxiliary wall 15 and the other part of the surface of the bridge pad 13 corresponds to the first auxiliary wall 14. In addition, an additional fixed element is not formed between the first auxiliary wall 14 and the surface of the bridge pad 13, which directly faces the first auxiliary wall 14, and instead, a second stress dispersion region 172 having a second stress dispersion distance d7 is formed. Here, the second stress dispersion region 172 is disposed along with an outer circumference of the fourth fixing region 164.

That is, the stress generated due to the first thermal insulating panel 11 and the bridge pad 13 which are contracted in opposite directions to each other may not be transferred to each other on the portion where the second stress dispersion region 172 is formed.

According to the embodiments of the present invention referred in FIGS. 3 and 4, the panel assembly 10 comprises one bridge pad 13 and one second auxiliary wall. However, it is available that the panel assembly 10 comprises a plurality of bridge pad and a plurality of second auxiliary walls.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cargo tank for a liquefied gas carrier ship, the cargo tank comprising:

a main wall surrounding a receiving space in which the liquefied gas is received;

a panel assembly surrounding the main wall; and an outer wall surrounding the panel assembly, wherein the panel assembly comprises:

a plurality of first thermal insulating panels arranged to be separate first distances from each other;

a plurality of first auxiliary walls, first surfaces of which are fixed on the first thermal insulating panels, separate from each other;

a plurality of second thermal insulating panels fixed on second surfaces of the first auxiliary walls and arranged with second distances, which are greater than the first distances;

a bridge pad disposed between the second thermal insulating panels and separate from the second thermal insulating panels; and a second auxiliary wall located between the bridge pad and the first auxiliary walls, having first surfaces fixed on the bridge pad, and second surfaces, a part of which are fixed on the first auxiliary walls, wherein between each of the first thermal insulating panel and each of the first auxiliary walls fixed on the first thermal insulating panel, a first fixing region on which an adhesive is applied to fix the first thermal insulating panel and the first auxiliary wall to each other, and a first stress dispersion region on which the adhesive is not applied for preventing the first auxiliary wall or the second auxiliary wall from being damaged due to thermal expansions or contractions of the first thermal insulating panels and the bridge pad.

2. The cargo tank of claim 1, wherein the first stress dispersion region is located on a circumferential portion of the first surface in the first auxiliary wall.

3. The cargo tank of claim 2, wherein a second fixing region is disposed between each of the first auxiliary walls and second auxiliary wall, and some parts of the first and second fixing regions overlap each other.

4. The cargo tank of claim 1, wherein a second stress dispersion region which does not overlap the first stress dispersion region is formed between each of the first auxiliary walls and each of the bridge pad, for preventing the first auxiliary wall or the second auxiliary wall from being damaged due to thermal expansions or contractions of the first thermal insulating panels and the bridge pad.

* * * * *